United States Patent

Attardi et al.

[11] Patent Number: 5,138,918
[45] Date of Patent: Aug. 18, 1992

[54] METHOD AND APPARATUS FOR SECURING DRUM BLANKS ON ISOSTATIC MANDREL

[75] Inventors: Anthony A. Attardi; Alexander A. Antonelli; Stuart B. Berger, all of Rochester; Frederick A. Warner, Fairport; William G. Herbert, Williamson; Paul J. Kaveny, Rochester; Joseph Mammino, Penfield; Ernst F. Matyi, Webster, all of N.Y.

[73] Assignee: Xerox Corporation, Stamford, Conn.

[21] Appl. No.: 531,062

[22] Filed: May 31, 1990

[51] Int. Cl.⁵ .............................................. B23B 1/00
[52] U.S. Cl. ......................................... 82/1.11; 269/7; 29/895; 29/129.5; 82/168
[58] Field of Search .................... 269/7; 29/559, 424, 29/129.5, 895, 895.2, 895.21; 82/168, 169, 1.11; 51/227 R

[56] References Cited

U.S. PATENT DOCUMENTS

| | | | |
|---|---|---|---|
| 1,380,136 | 5/1921 | Doan et al. | 279/8 |
| 1,414,190 | 4/1922 | Koehler | 279/8 X |
| 2,630,039 | 3/1953 | Klemm | 82/169 |
| 2,641,879 | 6/1953 | Dalrymple | 269/7 |
| 3,540,119 | 11/1970 | Manoly | 29/424 |
| 3,799,822 | 3/1974 | Lewicki, Jr. et al. | 29/129.5 |
| 3,861,012 | 1/1975 | Spaeder, Jr. | 29/129.5 |
| 3,970,494 | 7/1976 | Pritchard | 29/424 X |
| 4,744,914 | 5/1988 | Filisko et al. | |
| 4,822,013 | 4/1989 | Johnson | |

FOREIGN PATENT DOCUMENTS

| | | | |
|---|---|---|---|
| 3302823 | 8/1984 | Fed. Rep. of Germany | 29/559 |
| 1115880 | 9/1984 | U.S.S.R. | 269/7 |

Primary Examiner—Larry Schwartz
Assistant Examiner—Robert I. Schultz
Attorney, Agent, or Firm—Oliff & Berridge

[57] ABSTRACT

A method and apparatus for securing a drum blank for machining includes inserting a cylindrical mandrel within a bore of a drum blank, introducing a liquid support material into a space between the outer diameter of the mandrel and the inner diameter of the drum blank, and solidifying the support material. Once the support material is solidified, the drum blank is securely held to the mandrel. Machining operations can be performed by mounting the assembly in a lathe. After machining is completed, the support material may be treated so that the mandrel can be removed from the drum blank. The mandrel may then be recycled.

15 Claims, 2 Drawing Sheets

METHOD AND APPARATUS FOR SECURING DRUM BLANKS ON ISOSTATIC MANDREL

BACKGROUND OF THE INVENTION

The present invention is directed to machining, in particular, to machining drum or tube blanks to be used for electrophotographic and ionographic imaging members. The present invention is also directed to an apparatus for securing a workpiece on a mandrel.

Ionographic and electrophotographic imaging members may be provided in a number of forms. One form comprises a rigid supporting drum on which the imaging layer or layers are mounted. In some applications, for example, in liquid ink processes and ionographic processes, the drum has stringent specifications for straightness, taper, and run-out error. It is therefore necessary to provide a method for manufacturing large, very straight drum blanks having minimal radial run-out error and low unit manufacturing cost.

One process for producing drum blanks uses a diamond lathe to machine the surface of the drum blank. Although diamond lathe facilities provide good results, it is difficult to mount the drum blanks during machining. The chucking or holding process used to support the drum blank during machining tends to non-uniformly stress the drum during the turning cycle. When the holding forces are released, the drum relaxes, tending to adversely affect the straightness of the drum blank.

It is known to secure different types of components for machining. One apparatus for securing turbine blades is disclosed in U.S. Pat. No. 4,822,013 to Johnson. In this apparatus, a casing is provided which is filled with location material for securing the component. The location material preferably has a high resistance to extrusion and acts to locate the component during machining.

Another process for fixing parts for machining is disclosed in Soviet Patent No. 1,115,880. The process comprises pouring a fluid such as water into a cavity having a deformable tube inserted therein. The fluid solidifies when cooled. Expansion of the solidifying fluid is compensated for by the tube, allowing for a more precise fixing of parts for machining.

Although the above-described devices are advantageous for fixing particular components for machining, there continues to be a need for fixing and mounting drum blanks for electrophotographic and ionographic applications.

SUMMARY OF THE INVENTION

One object of this invention is to provide a method and apparatus for securing a workpiece to a mandrel and for machining the workpiece.

Another object of the invention is to provide a method and apparatus for producing straight drums.

Yet another object of the invention is to machine drums at low cost.

These and other objects of the invention are achieved by positioning a mandrel within a drum blank having an inner diameter which is slightly larger than the outer diameter of the mandrel, so that there is a space between the mandrel and the drum blank. This space is filled with a liquid support material which is then solidified to securely hold the drum blank and mandrel together. The mandrel is provided with precision centers for mounting the assembly to a lathe for machining. Various portions of the drum blank may then be machined or treated in any other manner. After machining is complete, the drum/mandrel assembly may be treated to allow for the drum and mandrel to be separated. The mandrel may then be cleaned and reused for machining another drum blank.

BRIEF DESCRIPTION OF THE DRAWINGS

A more complete understanding of the invention can be obtained by reference to the accompanying drawings, wherein.

DETAILED DESCRIPTION OF PREFERRED EMBODIMENTS

Figure 1:
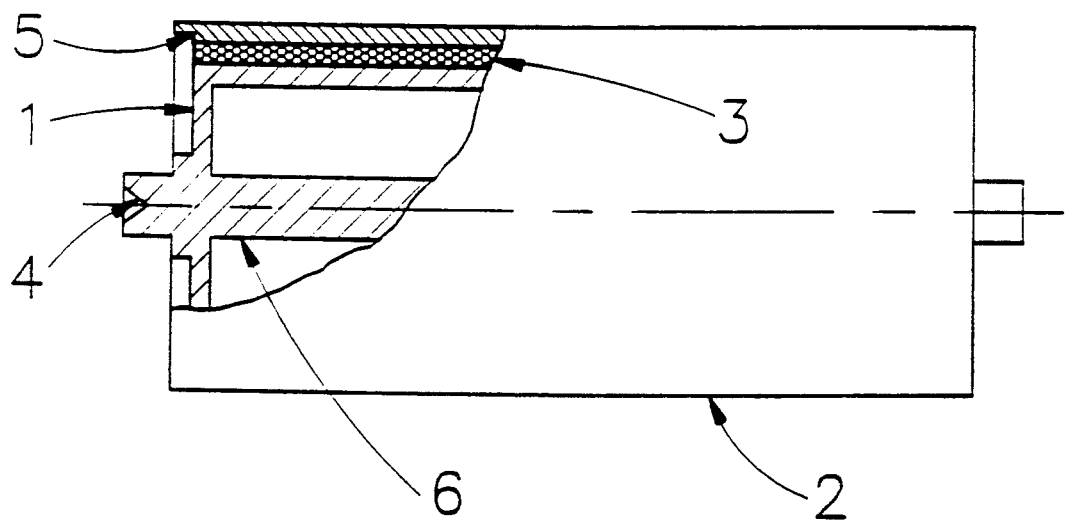
FIG. 1 is a cross-sectional view of the apparatus of the invention.

The present invention provides a method for and an apparatus for machining drum blanks, and in particular, for mounting and securing drum blanks on a mandrel, on which they are held as they are machined.

In a method according to the present invention, a mandrel having precision centers is inserted into a cylindrical bore of a tube blank, the outer diameter of the mandrel being slightly smaller, preferably by about 0.025 centimeters, than the inner diameter of the cylindrical bore of the drum blank. The rotational axis of the mandrel is preferably vertical. The drum blank is then heated, and liquid support material is supplied to fill the space between the mandrel and the cylindrical bore of the drum blank. To achieve good wetting of the two surfaces, vacuum and/or slow rotational motion are preferably imparted to the drum blank while the mandrel is held stationary. The drum blank, mandrel and liquid support material are then cooled to solidification of the liquid support material; the drum blank and the mandrel are thus frozen into one unit, which can be mounted in a precision diamond tooled lathe by means of the precision centers on the mandrel. The lathe is then activated to impart rotation to the mandrel/drum blank unit, and the drum blank may be machined. After all machining operations or other treatments have been completed, the mandrel/drum blank unit is treated, typically by heating to liquify the support material, allowing for removal of the mandrel from the drum blank.

The present invention is applicable to drum blanks of many different sizes and shapes. The following description focuses on drum blanks of sizes and shapes typically used in electrophotographic and ionographic imaging members.

The drum blank of the present invention is typically hollow and cylindrical. The drum blank may have an outer diameter ranging from about 3 cm to about 70 cm, preferably from about 5 cm to about 40 cm. The cylindrical wall of the drum blank generally has a thickness from about 0.025 cm to about 1 cm, preferably about 0.050 cm to about 0.20 cm. The inner diameter of the drum blank is in the range of from about 3 cm to about 7 cm. The length of the drum blank is in the range of from about 2 cm to about 250 cm, preferably from about 8 cm to about 40 cm.

Counterbores may be provided at the ends of the drum blank. Counterbores are precision machined areas within the tube or drum which accept a precision machined endbell to support the photoreceptor within the drum cavity of a copier. These counterbores generally extend axially into the drum blank for a length of about 0.02 cm to about 2 cm and the thickness of the drum blank in the regions of the counterbores is from about 0.020 cm to about 1 cm. The dimensions of the counterbores depend on the end feature to be provided.

The drum blank may be formed of any of various materials which may be machined and include, for example, aluminum, plastic, brass, copper, zinc, nickel, glass, ceramic, ferrous alloys, phenolic resin, polyester, polycarbonate, and other polymeric materials optionally filled with conductive material such as carbon black, silver, nickel, steel or other material which renders the composite structure conductive, and the like. The selection of a particular material depends on the purposes for which the drum blank will be used. Preferred materials for drum blanks for electrophotographic and ionographic imaging members include aluminum and aluminum alloys, nickel, brass, phenolic resin and polyester.

The mandrel is preferably cylindrical and tubular, and may be solid or hollow, provided that the cylindrical wall of the mandrel can impart sufficient rigidity to the drum blank. The outer and inner surfaces of the mandrel and drum blank, respectively, may be smooth or roughened, and patterned, for example, by ridges to facilitate the flow of the fluid support material therebetween. Any surface pattern or feature, however, preferably does not exceed a peak to valley roughness of about 0.0125 cm. The mandrel is preferably ultra-rigid to provide the needed support especially when a cutting tool is midway through the length of the drum blank during outer diameter cuts. The length of the mandrel is preferably about the same as that of the drum blank, not including the length of any counterbores. Mandrels of other lengths can be employed. The mandrel preferably has a shaft which extends therethrough, the ends of the shaft including mounting means for mounting the assembly to a lathe. The shaft may be formed as a separate piece or may be integrally formed with the mandrel. The shaft is provided with precision centers which make it possible to precisely mount the assembly in a lathe for machining.

The support material which can be used in the present invention may be any material which is solid at the temperature used to machine the drum blank, and which may be removed after machining. Any fluid materials which can be introduced within the space between the mandrel and the drum, and which can be solidified therein, can be used. The choice of the support material is based on its coefficient of expansion during the liquid-to-solid phase change and the accuracy requirements of the finished drum. The optimum process involves a very low-melting temperature support material exhibiting little or no expansion during the phase change and good structural strength. Preferably, a support material which can be fairly rapidly converted from a solid to a liquid phase is used. Such materials include, for example, water, waxes, epoxies, paraffin, polyethylene glycol, woods metal, low melt alloys, solder, methoxy polyethylene glycol and other materials of low melting temperature, i.e., materials which have a melting point generally ranging from about 40° C. to about 150° C., and preferably from about 45° C. to about 100° C. For example, polyethylene glycols (for example, having a molecular weight of about 14,000) exist as solids at room temperature and some are liquids at a temperature of about 60° C. Other materials which may be used in the invention include, for example, oxidizable or reducible materials or solvent soluble materials such as organic acid halides, anhydrides, acids, alcohols, amides, amines, esters, hydrocarbons, sulfonamides, and the like. For example, the fluid material may be a mixture of materials which, upon reaction, forms a solid material or which is a highly viscous fluid in an electric field such as those described in U.S. Pat. No. 4,744,914. The thus formed solid material or high viscosity fluid may be removed by, for example, oxidation, solvents, reducing the electric field, or the like.

The outer diameter of the mandrel is selected so that when inserted into the bore of the drum blank, a space is provided between the outer diameter of the mandrel and the inner diameter of the drum. This space preferably has a width of from about 3 mm to about 50 mm, more preferably, from about 10 mm to about 20 mm. The space between the outer diameter of the drum and the inner diameter of the blank is selected such that a support material can be introduced therein so that rigid support is imparted to the drum blank when the support material solidifies. Effects of phase change expansion can be minimized by proper selection of the filing gap dimension. The gap should be minimal to reduce support material expansion effects, and yet sufficiently wide to insure uniform wetting of the drum and mandrel surfaces by the liquid support material. Wetting of the drum surfaces may also be facilitated by applying, for example by painting, the support material to the surfaces which will define the gap prior to assembling the drum blank and mandrel.

FIG. 1 shows an assembly of the present invention comprising a mandrel 1 within a drum blank 2 having counterbores 5. Support material 3 fills the space between the outer diameter of the mandrel 1 and the inner diameter of the drum blank 2. The mandrel is provided with means for supporting the assembly for machining, comprising a shaft 6 extending through the mandrel. The shaft has precision centers 4 at opposite ends, which precision centers assist in precisely mounting the assembly in a lathe. The mandrel is designed so that there is access to both counterbores 5 so that the counterbores can be machined. The length of the mandrel 1 is about the same as that of the drum blank 2, not including the length of the counterbores 5.

EXAMPLE

A mandrel having precision centers is inserted into a tube blank having an inner diameter approximately 0.025 centimeters larger than the outer diameter of the mandrel. The rotational axis of the mandrel is approximately vertical.

The drum blank is then radiantly and/or conductively heated to 150° F. After it is up to temperature, liquid polyethylene glycol at 150° F. is poured into the gap between the mandrel and the drum blank. To achieve good wetting of the two surfaces, vacuum and slow rotational motion are imparted to the drum blank while the mandrel is held stationary.

When the space between the mandrel and the drum blank is filled, the assembly is cooled to solidify the polyethylene glycol. The drum blank and the mandrel are now "frozen" into one unit and will remain so at room temperature.

The mandrel/drum blank assembly is mounted in a precision diamond toothed lathe by means of the precision centers at each end of the mandrel.

The design of the mandrel allows access to both ends of the drum blank for simultaneously machining counterbores. After the counterbores have been machined, a rough and finish cut is taken on the outer diameter of the drum blank.

After all machining operations have been completed, the assembly is heated until the polyethylene glycol liquifies and allows removal of the mandrel. Heating may be applied to the whole assembly or to the mandrel or drum blank.

The mandrel and drum are then separated and cleaned. The mandrel can then be recycled for machining another drum blank.

Figure 2:
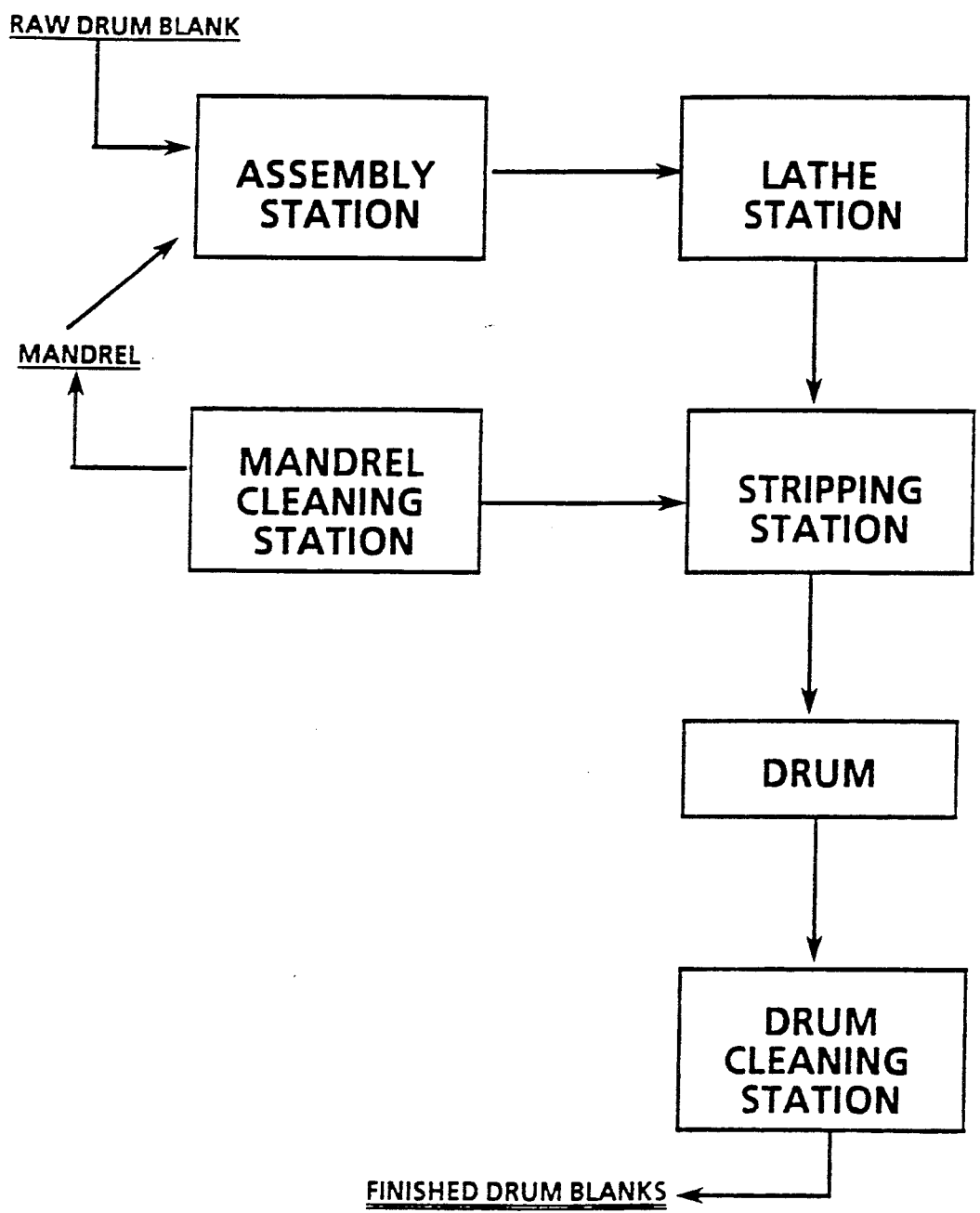
FIG. 2 is a schematic flow diagram of the process of the invention.

FIG. 2 outlines an example of a process layout utilizing multiple mandrel assemblies to increase lathe throughput. In the process, the mandrel is repeatedly recycled.

The process begins with the step of assembling a raw drum blank and the mandrel at an assembly station, where the mandrel and/or drum blank is/are heated. A heated support material is injected into the space between the drum blank and the mandrel. The assembly is then cooled to solidify the support material.

The solidified assembly is transferred to a lathe station where the assembly is mounted on a lathe. Machining of the counterbores, rough cuts and finished cuts on the outer diameter of the drum, and any other machining operations are performed. The assembly is then removed from the lathe and transferred to a stripping station.

At the stripping station, the assembly is treated, for example by heating, to remove the finished blank. The separated machined drum blank and mandrel are then transferred to separate stations.

The drum blank is transferred to a drum cleaning station where any residual support material is removed from the inner diameter of the drum blank. The finished drum blank is now ready for use in manufacturing an imaging device.

The mandrel is transferred to a mandrel cleaning station where any residual support material is removed from its outer diameter. Further, the precision centers are cleaned to ensure precision centering on the lathe. The mandrel may then be returned to the first step of the process for use with another drum blank.

The low temperature melting material used in the abovedescribed process provides a rigid, non-stressed interface of uniform support between the mandrel outer diameter and the drum blank when the support material is in the solid phase. Thus, the present invention provides stress-free mounting and ultrastraight diamond lathe turning of the blanks, with minimal radial run-out error, in which the drum remains undistorted during machining. Dampening of resonant cutting or buffing tool vibrations is also provided. Further, the ultra-rigid mandrel core provides the needed support especially when the cutting tool is midway through the length of the drum blank during the outer diameter cuts. Since both counterbores and the outer diameter are machined in one mounted set-up, good concentricity between the counterbores and the outside diameter is achieved. The above-described process makes it possible to design a thinner drum wall because of the excellent rigidity of and support provided by the mandrel, thereby achieving lower cost.

The process may also be used to produce high precision single component developer rolls, fuser rolls, two component magnetic brush developer rolls, liquid developer rolls, and the like.

Of course, the invention is not intended to be limited to the specific embodiments disclosed herein. For example, a variation of the process includes the use of a low-cost drum core insert (mandrel) having an integral shaft. This mandrel/core could be permanently bonded to the drum blank, for example by the use of a bonding agent. After machining operations are completed, the mandrel can remain as part of the assembly.

While the invention has been described with reference to specific preferred embodiments, it is not intended to be limited thereto. Rather, those skilled in the art will recognize that variations and modifications may be made therein which are within the spirit of the invention and within the scope of the claims.

What is claimed is:

1. A method for machining a drum blank for forming electrophographic and ionographic imaging members, comprising:
   positioning a mandrel within a drum blank, an outer diameter of the mandrel being smaller than an inner diameter of the drum blank, such that there is a space between said mandrel and said drum blank of a width of from about 3 mm to about 50 mm;
   introducing a liquid support material into said space;
   solidifying said support material such that said drum blank and mandrel are rigidly held together;
   machining said drum blank; and
   rotating said mandrel relative to said drum blank after or during the step of introducing said support material.

2. The method of claim 1, wherein said mandrel and said drum blank are cylindrical.

3. The method of claim 1, wherein said space is of a width of about 10 mm to about 20 mm.

4. The method of claim 1, wherein said support material is selected from the group consisting of water, paraffin, polyethylene glycol, methoxy polyethylene glycol, and electroviscous fluid.

5. The method of claim 1, wherein said machining step is performed whiled said mandrel is mounted on a lathe.

6. The method of claim 5, wherein said mounting is conducted by aligning precision centers provided at opposite ends of said mandrel with said lathe.

7. The method of claim 1, wherein said machining step includes machining counterbores at opposite ends of said drum blank.

8. The method of claim 1, wherein said machining step includes machining an outer diameter of said drum blank.

9. The method of claim 1, wherein said drum blank and said liquid support material are at a temperature greater than room temperature during the step of introducing said liquid support.

10. The method of claim 1, further comprising steps of heating said support material after said machining step to liquify said support material and removing said mandrel from said drum blank.

11. The method of claim 10, further comprising the step of cleaning the mandrel to remove any residual support material.

12. The method of claim 3, wherein during at least the step of introducing said support material, an axis of said mandrel is vertical.

13. The method of claim 1, wherein said drum blank has: an outer diameter ranging from about 3 cm to about 70 cm; a cylindrical wall having a thickness ranging from about 0.025 cm to about 1 cm; an inner diameter in the range of from about 3 cm to about 7 cm; and a length of from about 2 cm to about 250 cm.

14. A method for machining a drum blank for forming electrophotographic and inorgraphic imaging members, comprising:

positioning a mandrel within a drum blank, an outer diameter of the mandrel being smaller than an inner diameter of the drum blank, such that there is a space between said mandrel and said drum blank;

introducing a liquid support material into said space;

rotating said mandrel relative to said drum blank after or during the step of introducing said support material;

solidifying said support material such that said drum blank and mandrel are rigidly held together;

machining a counterbore at opposite ends of said drum blank; and completing machining of said drum blank.

15. The method of claim 14, wherein said drum blank has: an outer diameter ranging from about 3 cm to about 70 cm; a cylindrical wall having a thickness ranging from about 0.025 cm to about 1 cm; an inner diameter in the range of from about 3 cm to about 7 cm; and a length of from about 2 cm to about 250 cm.

* * * * *